March 26, 1968  L. F. DACHEUX, JR  3,374,614
SELF-CLEANING HAND RAKE

Filed Oct. 20, 1965  2 Sheets-Sheet 1

INVENTOR.
LOUIS F. DACHEUX, JR.
BY
ATTORNEY

March 26, 1968     L. F. DACHEUX, JR     3,374,614

SELF-CLEANING HAND RAKE

Filed Oct. 20, 1965     2 Sheets-Sheet 2

INVENTOR.
LOUIS F. DACHEUX, JR.
BY
ATTORNEY

United States Patent Office 3,374,614
Patented Mar. 26, 1968

3,374,614
SELF-CLEANING HAND RAKE
Louis F. Dacheux, Jr., 50 Locust Lane E.,
York, Pa. 17403
Filed Oct. 20, 1965, Ser. No. 498,279
6 Claims. (Cl. 56—400.2)

This invention pertains to a self-cleaning hand rake and, more particularly, to a hand rake having rotatable, supporting wheels to gauge the depth at which the tines of the rake will operate or determine a distance the ends of the tines are to be spaced above the ground while raking.

Various types of hand rakes have been provided heretofore with supporting means of various kinds to regulate the depth at which the lower ends of the tines will operate within the soil or be spaced thereabove. However, these devices have not been as simple or as effective as the rotatable supporting means adjustably mounted on applicant's rake for such purposes. Similarly, certain mechanisms have previously been devised of various types, mostly of a complicated nature, for clearing the tines of material raked thereby. None of these however appear to be as simple or as effective as the self-cleaning aspect of the present invention.

Under the foregoing circumstances, it is the principal object of the present invention to provide very simple, compact, and highly effective means, capable of long life, for supporting a rake element comprising a series of spaced tines for disposition in operative relationship with respect to the handle so as generally to extend vertically downward in the operative raking position toward the operator, while the mounting means for the rake permit free rearward pivotal movement of the rake element per se with respect to its supporting means, against the action of gravity which normally holds the rake element in vertical, operative position, so that when the rake is moved away from the operator, such pivotal movement will permit the rake to clear itself of any material accumulated thereupon or tending to adhere thereto.

It is another object of the invention to provide highly effective, compact, and multi-purpose brackets respectively disposed adjacent opposite ends of the rake element and supported in operative position in transversely spaced relationship to each other and adjacent the opposite ends of the rake element by a spacing member which is connectable to the brackets by simple but effective means, said brackets adjustably supporting trunnions upon which the supporting wheels are mounted for rotation about a horizontal axis.

It is a further object of the invention to provide said aforementioned brackets each with spaced stop members respectively operable to be engaged by the rake when in depending, substantially vertical position as when the rake is being moved toward the operator, and also to prevent self-clearing, rearwardly pivoted movement of the rake element an appreciable distance above horizontal, particularly to prevent the rake element from rotating through substantially a complete revolution for example and thus possibly not be in position upon the next raking stroke to operatively engage the stop elements provided to dispose the same in such downwardly depending, substantially vertical operative position.

It is still another object of the invention to provide locking means by which the rake element may be secured against pivotal movement upon the transverse spacing member which normally supports the same for limited pivotal movement, whereby the rake element is maintained stationary with respect to the spacing member and bracket so that it may be used in operative, raking position regardless of whether it is being moved toward or from the operator, thereby resembling the action of a normal, simple hand rake except for the fact that the rake comprising the present invention is provided with rotatable supporting wheels for the purposes referred to above.

Details of the foregoing objects and of the invention, are set forth in the following specification and illustrated in the accompanying drawings comprising a part thereof.

Figures 1, 2, 3, 4:
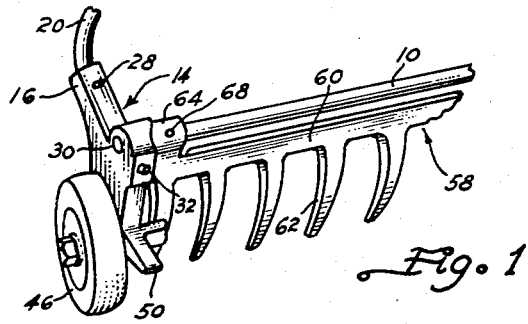
FIG. 1 is a fragmentary perspective view of one end of the self-cleaning hand rake embodying the principles of the present invention.
FIG. 2 is a side elevation of one of the brackets of the type shown in FIG. 1, details thereof being illustrated in full lines, while the handle attaching means as well as the supporting wheel associated therewith is illustrated in phantom.
FIG. 3 is a view similar to FIG. 2 but taken at right angles thereto so as to show additional details of one of the bracket elements and also showing one fragmentary end portion of the rake element which is pivotally supported for movement relative to the bracket.
FIG. 4 is a top plan view of the entire head end of the rake shown connected to the forward end of a handle fragmentarily illustrated in phantom.
Figure 5:
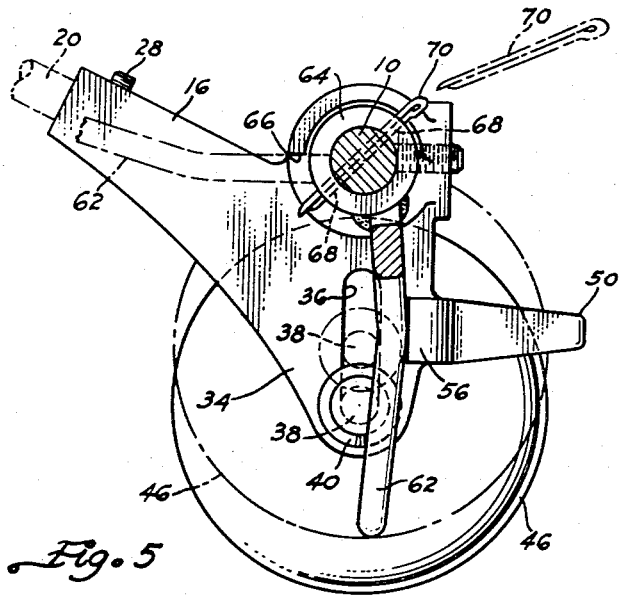

FIG. 5 is a view similar to FIG. 2 but illustrated on a larger scale and showing the rake element respectively in vertical, full line operative position, while in phantom, the rake is shown in the maximum pivoted movement to which the rake element is permitted to move to clear itself, the supporting reel also being illustrated respectively in full lines and phantom in two different adjusted vertical positions.

Figure 6:
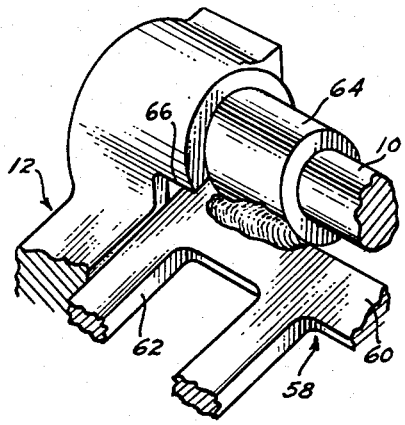

FIG. 6 is a fragmentary perspective detail showing a means by which one end of the rake element may be connected to an appropriate bearing member, said end of the rake element being shown nearly in position to engage the upper stop member to limit upward pivotal movement thereof.

Figure 7:
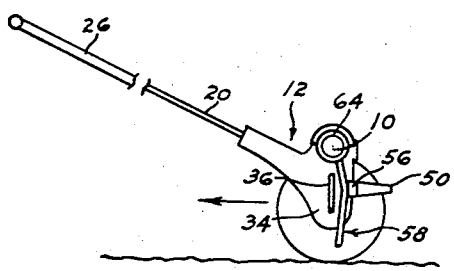
Figure 8:
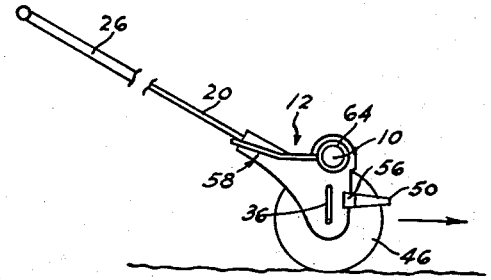

FIGS. 7 and 8 respectively are simple, side elevations shown somewhat diagrammatically, illustrating the operative position of the rake element with respect to the brackets and stop members therefor, and the rake element disposed in its highest permitted self-clearing position with respect to said brackets, as controlled by stop means for such purpose.

Figure 9:
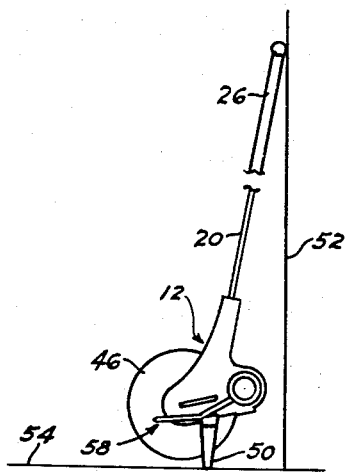

FIG. 9 is a view similar to FIGS. 7 and 8 but showing the rake positioned upon supporting projections in idle position, as when leaning against a wall to maintain the rake stationary and the wheels inoperative.

The present invention essentially comprises a transverse spacing member 10 which, for example, may comprise a desired length of metallic solid round bar stock, such as approximately one-half inch in diameter, the opposite ends thereof being connected to similar brackets 12 and 14 which preferably are formed from cast metal but may be molded from appropriate synthetic resin or plastics. Essentially, the brackets 12 and 13 are mirror images of each other although the side elevations are identical in outline.

Each bracket comprises a handle-connecting extension which projects rearwardly and slightly upwardly when the rake is disposed in operative position such as viewed in FIGS. 2, 5, 7 and 8. Each extension 16 has a socket 18 formed therein respectively for the reception of the opposite legs 20 of a connecting yoke 22, the same having a reversely bent central portion comprising an effective tang insertable frictionally within a complementary socket formed in the forward end 26 of a conventional rake handle.

The connecting yoke 22 may be formed from suitable metallic round solid bar stock or heavy tubular metallic bar stock of suitable diameter such as of the order of about ⅜ of an inch. The forward ends of legs 20 which are received within the sockets 18 are secured therein by any suitable means such as a rivet or a locking set screw 28.

Each bracket is provided with a suitable boss having a hole 30 bored therein respectively to receive the opposite ends of the spacing member 10, said inserted end of the spacing member being retained within the hole 30 by an appropriate pin or set screw 32.

Each of the brackets 12 and 14 also have projections 34 which depend substantially below the extension 16 when the rake is in use, said projections having vertical slots 36 therein for the reception of suitable horizontally extending trunnion members such as bolts 38 having heads 40 thereon which, as seen in FIG. 3, engage the inner faces of the projections 34 and the shanks of the bolts adjacent said edge preferably are of a square configuration so as slidably and non-rotatably to be disposed within the slots 36.

Also supported on each bolt is a washer 42, as seen in FIG. 3, and surrounding the bolt as well as abutting said washer is a cylindrical bearing sleeve 44 upon which a supporting wheel 46 of suitable diameter and thickness as well as appropriate composition such as rubber-like material, is rotatably mounted. The wheels are maintained upon the bearing sleeves 44 by suitable locking nuts 48 and coaxial washers which bear against suitable flange means illustrated in FIG. 3 respectively disposed on opposite sides of the wheel 46, whereby the wheel freely revolves upon the bearing sleeve 46 while the nut 48 is capable of locking the trunnion bolt 38 securely in desired vertical position within the slot 36.

Extending transversely forwardly from each depending projection 34, considered in the position of use of the rake, as shown in FIG. 2 for example, is a resting projection or finger 50 which, as shown in FIG. 9, projects beyond the periphery of the wheel 46 and when the rake is leaned at a suitable angle against a supporting wall 52 for example, the resting fingers 50 will rest upon the floor 54 and thus dispose the rotatable wheels 46 above the floor level so that the rake will remain in rest position as shown in exemplary manner in FIG. 9.

Projecting horizontally inward from each of the fingers 50 adjacent the inner end thereof, is a stop lug 56 which is engageable by the endmost tine of a rake element 58 comprising a conventional horizontal bar 60 having a plurality of similar tines 62 projecting transversely thereto in suitable spaced relationship to each other. At each end of the bar 60 of the rake element is a sleeve bearing 64, the same being freely rotatable upon the spacing member 10 to permit swinging the rake element between the operative position shown in FIGS. 1, 2, 5 and 7, wherein the endmost tines of the rake element are disposed against the stop lugs 56 at opposite sides of the rake, and the inoperative position shown in FIG. 8. Gravity maintains the rake element in said operative position, as well as the force being imposed upon the rake element while being moved in raking direction as illustrated in exemplary manner by the arrow in FIG. 7, as when the rake is being pulled toward the operator.

The mounting of the rake element and its bearing 64 for free rotation upon the spacing member 10 permits the rake to swing quite freely upon the member 10. In order to clear the rake of any material which might be adhering thereto, for example, as well as to facilitate the forward movement of the rake in normal inoperative direction, illustrated in exemplary manner by the arrow in FIG. 8, the rake 58 is freely pivotally movable rearwardly to the preferred maximum position illustrated in FIG. 8 and also shown in phantom in FIG. 5. Such inoperative movement is limited by engagement of the endmost tines with inwardly and axially extending stop lugs 66 which are adjacent the bearings 64 and are integral with the bosses containing the holes 30 which receive the opposite ends of the spacing member 10. The stop lugs 66 are shown to particular advantage in FIG. 6.

Pivotal movement of the rake element 58 with respect to spacing member 10 may be prevented by suitable locking means, one simple form of which comprises a drilled hole 68 which, as shown in FIGS. 1 and 5 extends diametrically through one of the bearings 64 and spacing member 10 for the reception of a locking member such as a cotter key 70. When such key is inserted in the hole, the rake element 58 is maintained in the vertical position shown in FIG. 5, whereby the rake may be pushed or pulled in opposite directions, such as exemplified in FIGS. 7 and 8 but in both directions of movement, the rake element 58 will be fixed in vertical position so as to operatively engage material being raked in both directions of movement of the rake. Such arrangement is particularly useful in preparing a lawn for seeding, raking in grass seed, and the like.

To restore the rake to the condition wherein the rake element 58 may freely move to the horizontal, inoperative position such as illustrated in FIG. 8, it is only necessary to remove the locking element 70 from the hole 68. If desired to prevent the locking element from becoming lost, it may be suitably retained within an accommodating hole, not shown, which conveniently could be formed in the bracket 14, for example. To further insure the locking member against loss, a flexible cord or small chain might be connected at one end thereto and at the other end connected to the bracket 14, thereby employing an expedient very commonly used to prevent the loss of removable elements in various types of apparatus.

While the invention has been described and illustrated in its several preferred embodiments, it should be understood that the invention is not to be limited to the precise details herein illustrated and described since the same may be carried out in other ways falling within the scope of the invention as claimed.

I claim:

1. A self-cleaning hand rake comprising in combination, a transverse spacing member, a pair of complementary brackets respectively connected to the opposite ends of said spacing member and having depending portions thereon, a handle, a connecting yoke connected to one end of said handle and having a pair of legs projecting forwardly therefrom and spaced similarly to said brackets, means connecting the forward ends of said legs respectively to said brackets, said depending portions of said brackets having slots extending substantially perpendicularly to the plane of said connecting yoke, trunnion members extending through said slots for adjustable positioning longitudinally thereof and respectively extending outwardly in opposite directions from said brackets, supporting wheels rotatably supported upon said trunnion members, a rake element having a longitudinal bar and a plurality of spaced tines projecting transversely therefrom, bearings connected to said longitudinal bar of said rake element adjacent opposite ends thereof, said bearings being mounted rotatably on said spacing member adjacent said brackets and the endmost tines of said rake element also being disposed adjacent said brackets, said wheels supporting said brackets and rake element in desired vertical position relative to the ground, and stop members fixed to and projecting inwardly from the lower extremities of said depending portions of said brackets for engagement by the lower portions of the endmost tines of said rake element to maintain said rake element in operative position substantially perpendicular to the handle when raking toward the operator and said bearings permitting said rake element to move rearwardly away from said stops and toward the plane of said connecting yoke when the rake is being pushed away from the operator but gravity serving to restore the rake element to said operative position when the rake is next pulled toward the operator.

2. The rake according to claim 1 in which said connecting yoke is formed from round rod stock and said brackets have socket members projecting rearwardly to receive the forward ends of said legs of said yoke, and means connecting said ends fixedly within said socket members.

3. The rake according to claim 1 in which the upper portions of said brackets respectively have apertures in axial alignment with each other and said transverse spacing member being a round rod having its opposite ends respectively disposed within said apertures and fixedly connected to said brackets.

4. The rake according to claim 1 further including additional stop members projecting inwardly toward each other respectively from the upper portions of said brackets and positioned for engagement by the endmost tines of said rake element when moving pivotally rearwardly to restrict such pivotal movement and thereby prevent complete rotation of said rake element about said transverse spacing member.

5. The rake according to claim 1 further including locking means engageable with said rake element and operable to maintain the same immovable upon said spacing member in operative raking position and in engagement wtih said stop members, whereby said rake may be moved operatively in opposite forward and rearward directions.

6. The rake according to claim 5 in which said locking means comprises a hole extending transversely and continuously through one of said bearings of said rake element and said spacing member when said rake element is in said operative position, and a pin member extending removably through said hole to hold said bearing member fixed relative to said spacing member.

References Cited
UNITED STATES PATENTS

| | | | |
|---|---|---|---|
| 784,095 | 3/1905 | Allison | 56—400.14 |
| 2,671,302 | 3/1954 | Prudlo | 56—400.2 |
| 2,702,981 | 3/1955 | McReynolds | 56—400.2 |

ABRAHAM G. STONE, *Primary Examiner.*

J. W. PETERSON, *Assistant Examiner.*